(12) United States Patent
Sladen

(10) Patent No.: US 6,545,638 B2
(45) Date of Patent: Apr. 8, 2003

(54) CORRECTING A PRIOR DEAD RECKONING DETERMINED POSITION MEASUREMENT USING GPS WHEN GPS IS LATER ACQUIRED

(75) Inventor: Peter Sladen, Winchester (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/007,506

(22) Filed: Oct. 18, 2001

(65) Prior Publication Data

US 2002/0105460 A1 Aug. 8, 2002

(30) Foreign Application Priority Data

Nov. 1, 2000  (GB) .............................................. 0026713

(51) Int. Cl.⁷ ................................................. G01S 5/14
(52) U.S. Cl. ................... 342/357.14; 701/216
(58) Field of Search ...................... 342/357.14; 701/216

(56) References Cited

U.S. PATENT DOCUMENTS

| | | | | |
|---|---|---|---|---|
| 5,257,195 A | * | 10/1993 | Hirata | 342/357.14 |
| 5,512,904 A | * | 4/1996 | Bennett | 342/357.14 |
| 5,543,802 A | | 8/1996 | Villevieille et al. | 342/357 |
| 6,308,134 B1 | * | 10/2001 | Croyle et al. | 701/216 |

FOREIGN PATENT DOCUMENTS

GB  2 335 040  9/1997

* cited by examiner

*Primary Examiner*—Fred H Mull
(74) *Attorney, Agent, or Firm*—Robert H. Kelly

(57) ABSTRACT

Dead reckoning is used to solve a location problem when a user is out of range of GPS coverage. A starting position is determined by tracking movements from a first position where GPS coverage is not available to a second position where GPS coverage is available. The starting position is then determined by backtracking from this known position.

11 Claims, 5 Drawing Sheets

CORRECTING A PRIOR DEAD RECKONING DETERMINED POSITION MEASUREMENT USING GPS WHEN GPS IS LATER ACQUIRED

FIELD OF THE INVENTION

The present invention relates to position determination, particularly but not exclusively to a method and device for permitting a user to find a location which is not within the coverage of the Global Positioning System (GPS).

BACKGROUND ART

The Global Positioning System (GPS) is a well-known satellite based system which provides position information to GPS receivers, for example the commercially available Garmin™ range of GPS receivers.

GPS is especially suitable for use in wide open areas, but, due to the nature of satellite communications, its availability is limited in highly built-up areas and underground, for example in an underground car park. To extend the apparent coverage of the GPS system from a user's point of view, other techniques are used to interpolate during the periods when the user is out of range of the GPS system. Such interpolation is performed by systems which are commonly referred to as dead reckoning systems, which involve estimating the current location by tracking movements from the last known GPS position, using sensors such as gyros, accelerometers, compasses and so on.

FIG. 1 illustrates a conventional interpolation system. A vehicle 1 equipped with a GPS receiver 2 and a dead reckoning system 3 travels between areas with GPS coverage 4, 5 through an area without GPS coverage 6. The position 7 of the vehicle 1 just before it enters the area without GPS coverage 6 is known from GPS data. During its transit through the non-GPS area 6, the dead reckoning system 3 estimates the position of the vehicle 1 based on its initial position 7 and its subsequent movements, using direction and speed detectors. On re-entry into an area with GPS coverage 5, the GPS receiver 2 once again takes over to provide accurate positional data 8. Depending on the accuracy of the dead reckoning system 3, there may be a discrepancy between the position 8 of the vehicle given by the GPS system and the position 9 estimated by the dead reckoning system 3. A vehicle position detector which uses a combination of GPS receiver and dead reckoner is described in U.S. Pat. No. 5,257,195.

If a user switches on a GPS receiver in an area where no GPS signal is available, he receives no positional information and is therefore unable to fix his position. The present invention aims to address this problem.

SUMMARY OF THE INVENTION

In accordance with the present invention, there is provided a method of providing positional information to a receiver which is arranged to receive a positioning system signal, the signal providing information relating to the receiver's current position, comprising the steps of tracking the receiver's route from a first position at which the positioning system signal is not available to a second position at which the positioning system signal is available, determining positional information defining the first position from the positioning system signal at the second position and the receiver's route between the first and second positions, and storing the positional information at the receiver.

The positional information defining the first position can be determined by back tracking from the second position along the route taken by the receiver between the first and second positions. By tracking the receiver's route until a positioning system signal, for example a GPS signal, is obtained, the user can be provided with information relating to his starting position once he has reached the position at which the GPS signal is available. This enables the user to return to his starting position from any other known position.

According to the present invention, there is further provided a device for providing positional information to a user, the device being arranged to receive a positioning system signal, the signal providing information relating to the current position of the device, comprising means for tracking the route of the device from a first position at which the positioning system signal is not available to a second position at which the positioning system signal is available, means for determining positional information defining the first position from the positioning system signal at the second position and the receiver's route between the first and second positions, and means for storing the positional information.

BRIEF DESCRIPTION OF THE DRAWINGS

Embodiments of the invention will now be described by way of example with reference to the accompanying drawings, in which.

DETAILED DESCRIPTION

Figure 1:
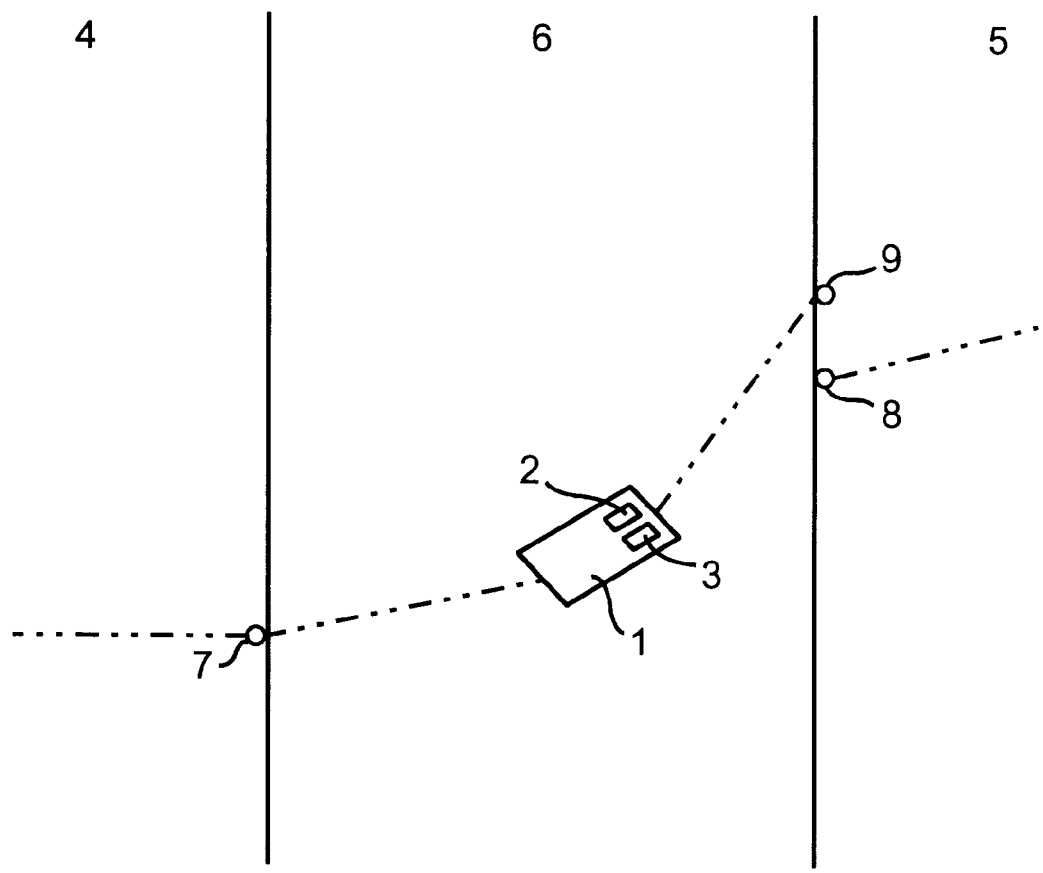
FIG. 1 is a schematic diagram illustrating a conventional GPS/dead reckoning interpolation system.
Figure 2:
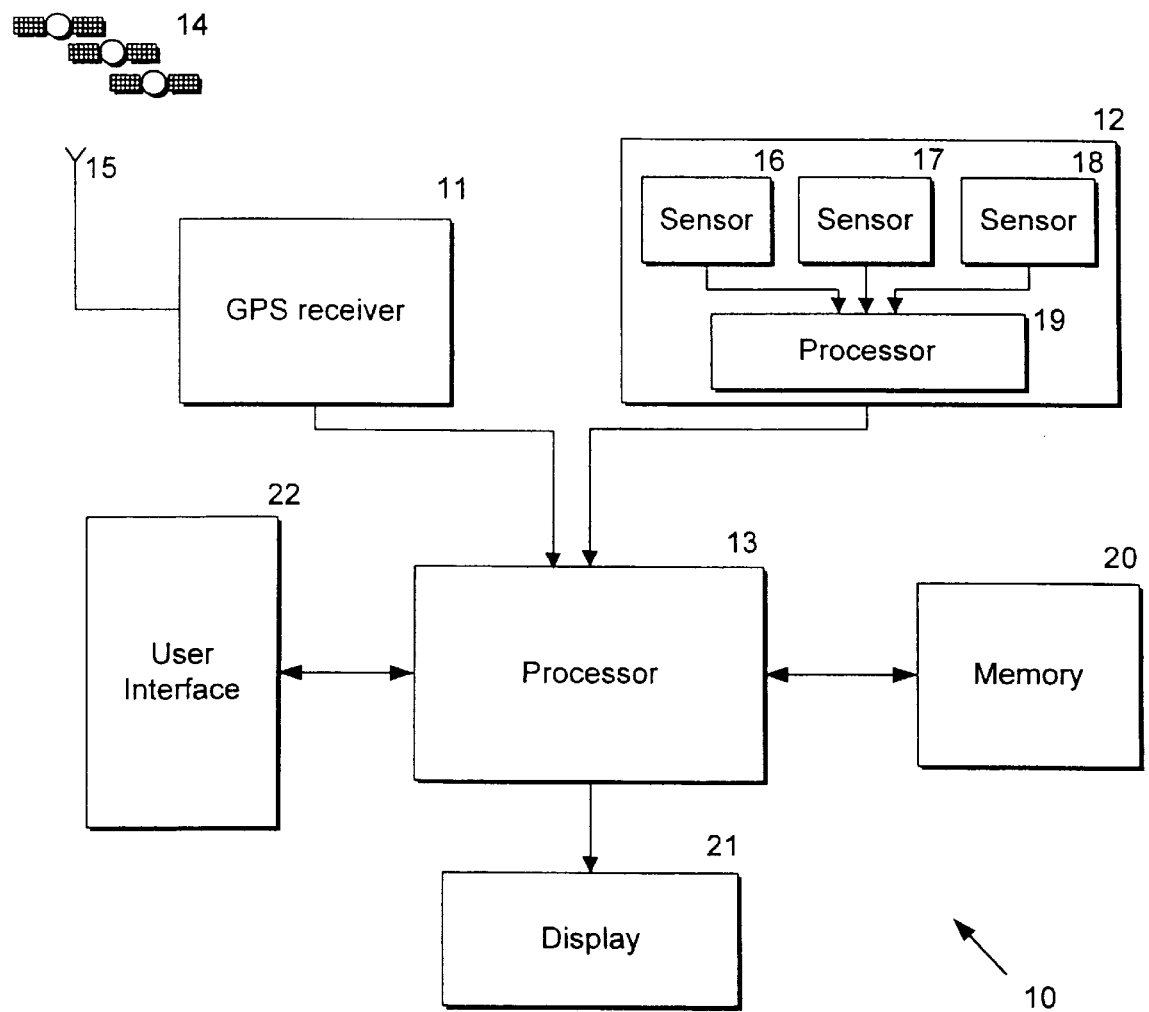
FIG. 2 is a schematic diagram of a device according to the invention.

Referring to FIG. 2, a locating device 10 according to the invention includes a GPS receiver 11, a dead reckoning system 12 and a processor 13. The GPS receiver 11 receives GPS signals from a GPS satellite constellation 14, via an antenna 15, in a manner which is well-known per se. The GPS receiver 11 calculates the positional information from the GPS signals and feeds this information to the processor 13. The dead reckoning system 12 comprises a plurality of sensors 16, 17, 18 feeding a local processor 19. The sensors 16, 17, 18 comprise devices such as accelerometers, odometers, gyroscopes and other conventional types of inertial navigation system. Reference is directed to Modern Inertial Navigation Technology and its Application, Electronics & Communication Engineering Journal April 2000, pages 49 to 64, for a detailed description of various types of inertial navigation system devices.

The locating device 10 also includes memory 20, a display 21 and a user interface 22.

Figure 3:
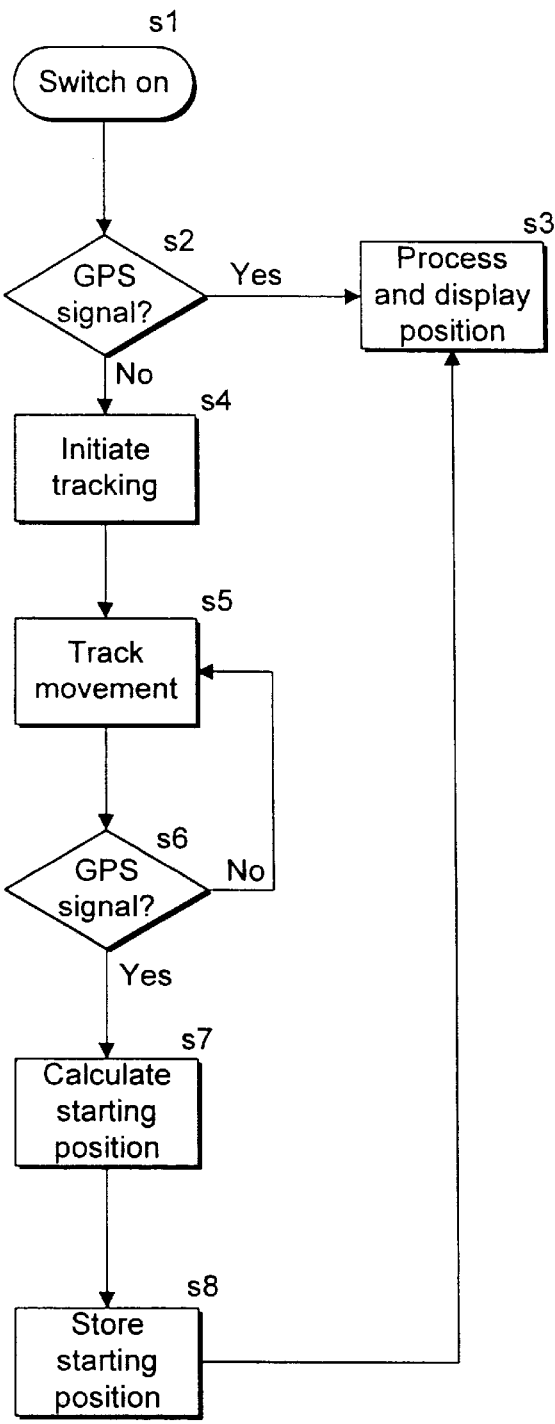
FIG. 3 is a flow diagram illustrating the operation of the device shown in FIG. 2.

Referring to FIG. 3, when a user switches on the locating device 10 (step s1), the device searches for a GPS signal (step s2). If a GPS signal is found, then the device processes that signal and displays the user's position in an entirely conventional manner (step s3).

If, however, no GPS signal is present, indicating that the device is outside the GPS operating range, then the device marks the user's current position as the starting position for tracking and initiates tracking (step s4). In an alternative embodiment, the device 10 only initiates tracking on receiving instructions from the user, for example by the user entering an appropriate command at the user interface 22. Tracking is initiated by enabling the dead reckoning system 12.

Once tracking has been initiated, any movements made by the user away from the marked starting position are tracked by the dead reckoning system 12. For example, an appropriate combination of inertial navigation devices tracks the distance and direction travelled by the user away from the starting location. Similarly, the distance by which the user ascends or descends from the starting level is also determined (step s5). During the tracking procedure, the processor 13 checks for the availability of a GPS signal (step s6). Tracking continues while a GPS signal is not available (step s5).

If the processor 13 determines that a GPS signal has become available (step s6), then the input from the dead reckoning system is stopped and the starting position is calculated based on the current GPS position information and the dead reckoning information (step s7), as will be described in more detail below. Once calculated, the starting position is stored in the memory 20 (step s8) and the location device 10 resumes its normal position indicating operation (step s3).

The process of calculating the starting position from the GPS position and dead reckoning information (step s7) will now be described by reference to FIG. 4.

Figure 4:
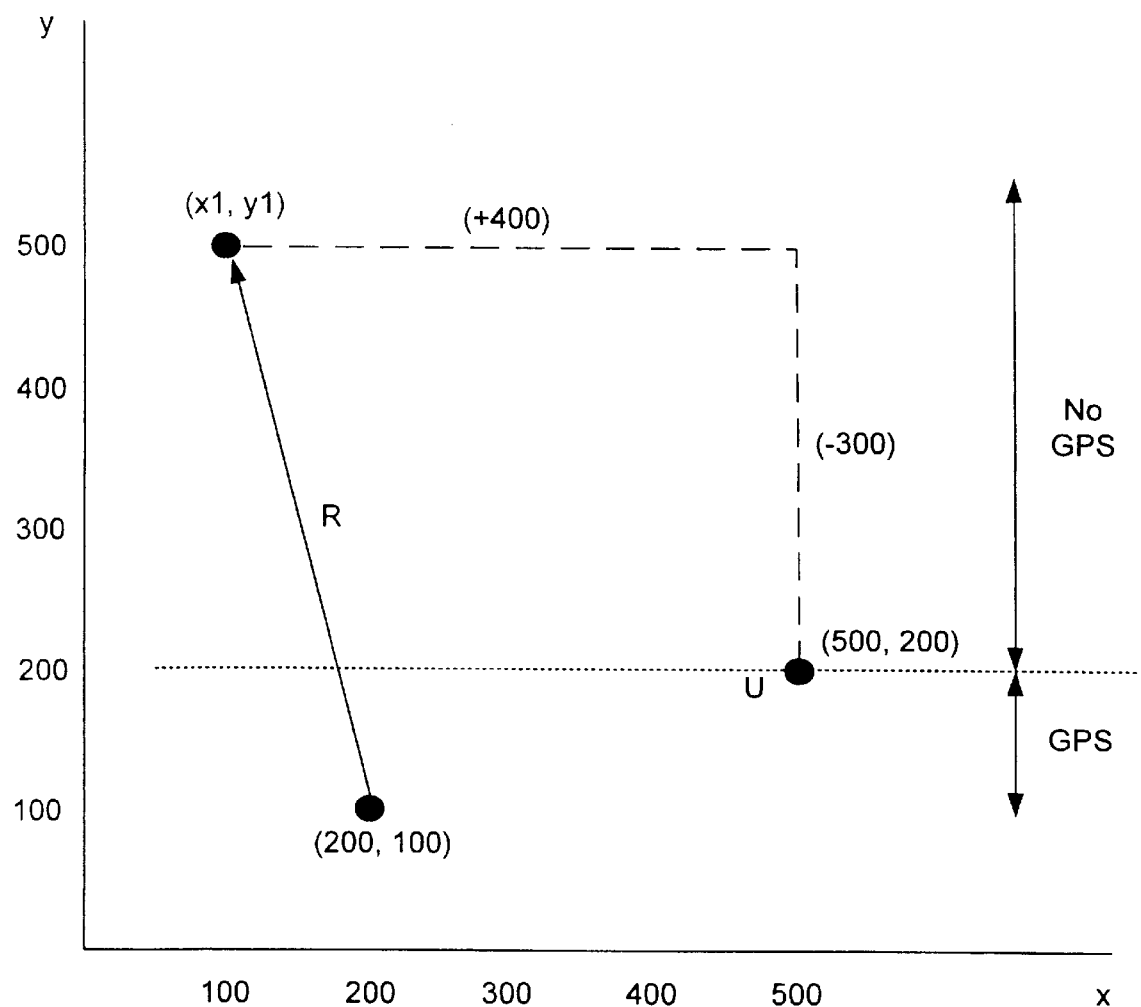
FIG. 4 is a schematic diagram illustrating the determination of a starting position in a two dimensional co-ordinate system.

FIG. 4 shows a user U starting from an unknown starting position (x1, y1) in a region where there is no GPS coverage. The user initiates tracking at the co-ordinates (x1, y1) (step s4) and proceeds to a region of GPS coverage which he enters at co-ordinates x=500, y=200, where the co-ordinates are arbitrarily chosen for the purposes of illustration only. During his progress from (x1, y1) to (500, 200), the locating device 10 tracks his movements by means of a dead reckoning system 12 (step s5). The dead reckoning system stores the fact that the user has progressed 400 units in an x direction and 300 units in a negative y direction from the starting position. Therefore, backtracking to the starting position can be performed by subtracting these measurements from the absolute position (500, 200) given by the GPS system. This means that:

$$x1 = (500) - (400) = 100$$
$$y1 = (200) - (-300) = 500$$

The starting position is therefore calculated (step s7) as (100, 500). While the mechanism for calculating starting position has been illustrated for a simple case in two dimensions, it will be appreciated by the skilled person that the starting position can be calculated for any complexity of route in a three dimensional co-ordinate system, as long as accurate values for the distances and directions taken by the user from the starting location to the GPS contact location are maintained.

Figure 5:
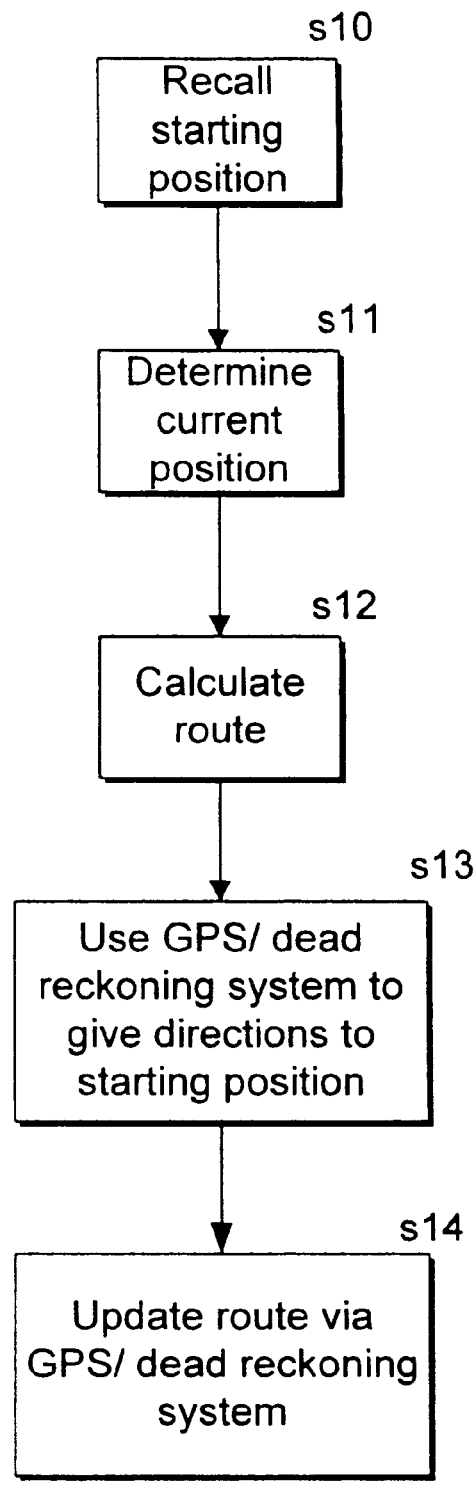
FIG. 5 is a flow diagram illustrating the location of a stored starting position given a known current position.

Referring to FIG. 5, once the starting position has been stored, the user can return to that position from any other known position by recalling the stored position on his location device 10 (step s10). The device 10 then determines its current position from current GPS data (step s11), calculates a route to the starting position (step s12) and gives directions to the user to return to the starting position (step s13). For example, referring again to FIG. 4, from a new starting position at coordinates (200, 100), the user is given a direct route R which results in him returning to the stored starting position. As the user encounters obstacles on, or otherwise deviates from the given route, GPS signals can be used to update the route while the user remains in the GPS region (step s14). However, once the user has crossed over into the no GPS region, the dead reckoning system can be used to keep the user appraised of his position relative to the starting position.

What is claimed is:

1. A method of providing positional information to a receiver which is arranged to receive a positioning system signal, the signal providing information relating to the receiver's current position, comprising the steps of:
    tracking the receiver's route from a first position at which the positioning system signal is not available to a second position at which the positioning system signal is available;
    determining positional information defining the first position from the positioning system signal at the second position and the receiver's route between the first and second positions; and
    storing the positional information at the receiver.

2. A method according to claim 1, including determining the positional information defining the first position by back-tracking from the second position along the route taken by the receiver between the first and second positions.

3. A method according to claim 1, including using dead reckoning to track the receiver's route between the first and second positions.

4. A method according to claim 1, comprising recalling the stored positional information from the receiver to define the first position relative to a known third position.

5. A method according to claim 1, wherein the positioning system comprises the Global Positioning System (GPS).

6. A device for providing positional information to a user, the device being arranged to receive a positioning system signal, the signal providing information relating to the current position of the device, comprising:
    means for tracking the route of the device from a first position at which the positioning system signal is not available to a second position at which the positioning system signal is available;
    means for determining positional information defining the first position from the positioning system signal at the second position and the receiver's route between the first and second positions; and
    means for storing the positional information.

7. A device according to claim 6, wherein the determining means comprise means for back-tracking from the second position along the route taken by the device between the first and second positions.

8. A device according to claim 6, wherein the tracking means comprises a dead reckoning system.

9. A device according to claim 6, wherein the device uses the stored positional information to define the first position relative to a known third position.

10. A device according to claim 6, comprising a Global Positioning System (GPS) receiver.

11. A device for providing positional information to a user, the device being arranged to receive a positioning system signal, the signal providing information relating to the current position of the device, comprising:

trading apparatus for tracking the route of the device from a first position at which the positioning system signal is not available to a second position at which the positioning system signal is available;

a positioning device for determining positional information defining the first position from the positioning system signal at the second position and the receiver's route between the first and second positions; and a storage element for storing the positional information.

* * * * *